July 11, 1939.　　　J. KOCH, JR　　　2,166,062
TROUBLE AND TRUNK LIGHT
Filed July 19, 1938　　　2 Sheets-Sheet 1
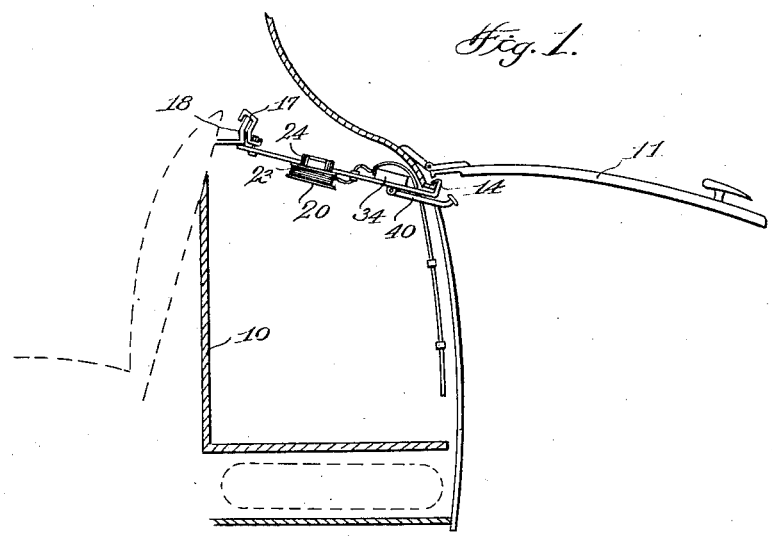
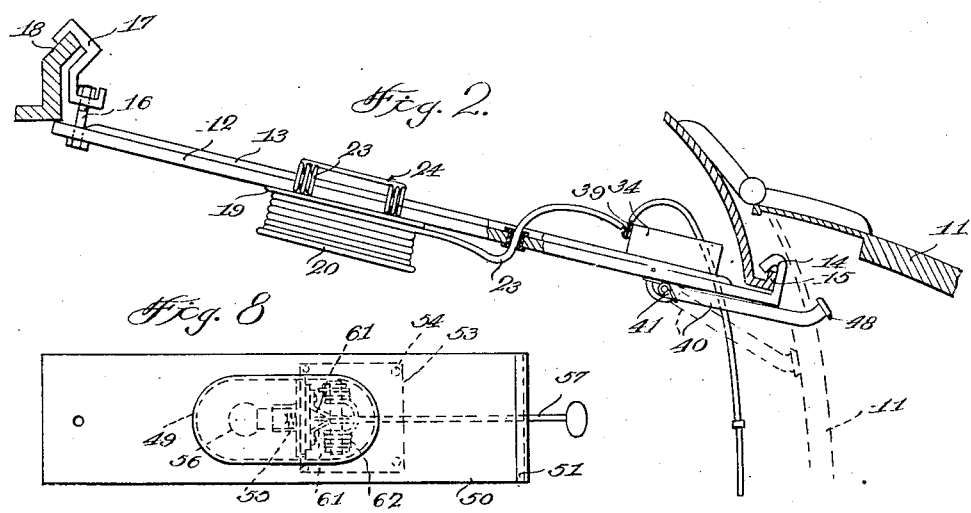
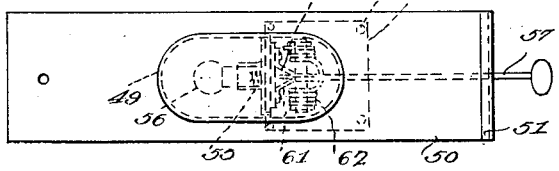
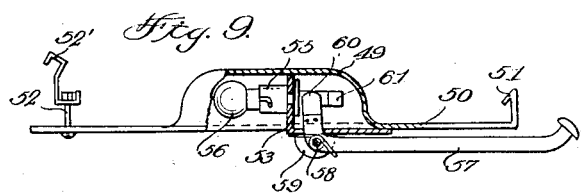
JOHN KOCH, JR.
INVENTOR
BY *Victor J. Evans & Co.*
ATTORNEYS July 11, 1939.   J. KOCH. JR   2,166,062
TROUBLE AND TRUNK LIGHT
Filed July 19, 1938   2 Sheets-Sheet 2
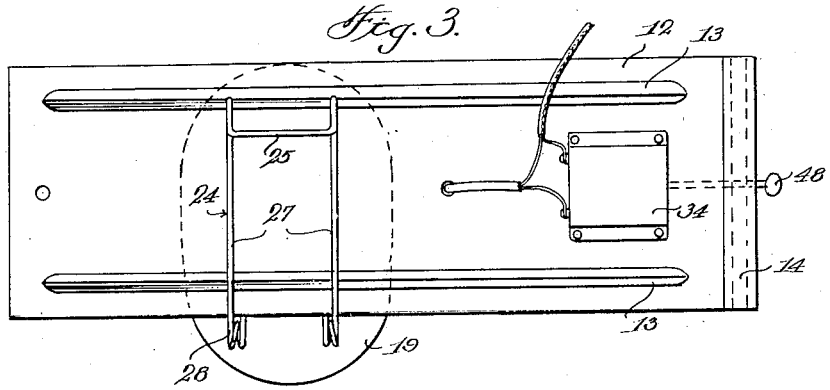
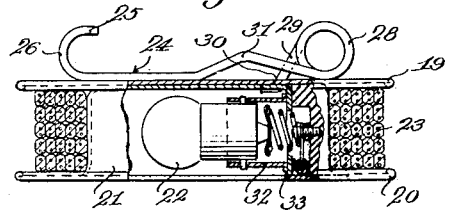
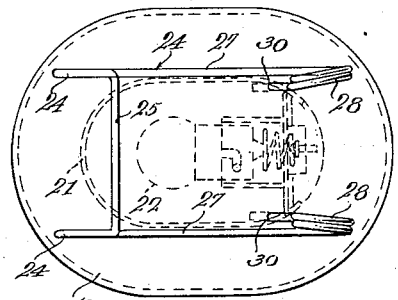
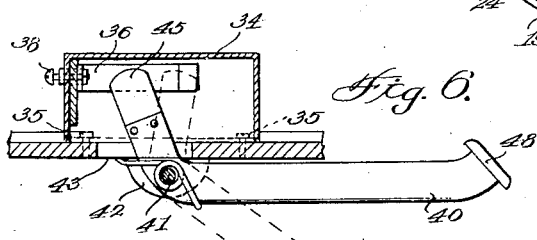
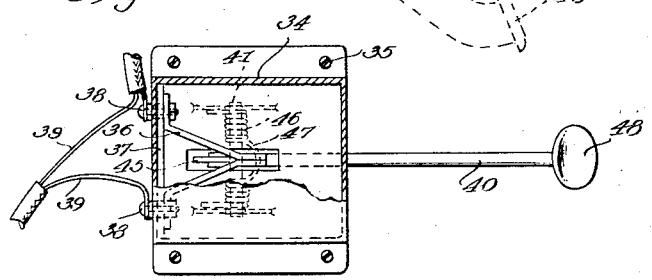
JOHN KOCH, JR.
INVENTOR
BY *Victor J. Evans & Co.*
ATTORNEYS Patented July 11, 1939

2,166,062

UNITED STATES PATENT OFFICE 2,166,062

TROUBLE AND TRUNK LIGHT

John Koch, Jr., Cheviot, Ohio

Application July 19, 1938, Serial No. 220,085

3 Claims. (Cl. 240—8.18)

This invention relates to a trouble and trunk light and has for an object to provide a novel device of this character which will automatically be turned on when the lid of the baggage compartment of a motor vehicle is opened and which may easily be detached from its supporting bracket and carried all around the vehicle to provide a convenient trouble light when desired.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a fragmentary longitudinal sectional view of the baggage compartment of an automobile equipped with a trouble and trunk light constructed in accordance with the invention.

Figure 2 is an enlarged longitudinal sectional view of the upper end of the baggage compartment showing the trouble and trunk light in side elevation.

Figure 3 is a plan view of the trouble and trunk light detached from the vehicle.

Figure 4 is a longitudinal sectional view of the light bulb and reel detached from the supporting bracket to provide a trouble light.

Figure 5 is a plan view of the light shown in Figure 4 with parts shown in dotted lines.

Figure 6 is a longitudinal sectional view of the switch showing the lever operated by opening of the compartment lid to move the switch to circuit closing position.

Figure 7 is a plan view of the switch shown in Figure 6 with a portion broken away.

Figure 8 is a plan view of a modified form of the light showing the switch and the light reflector and lamp bulb assembled as a unitary structure.

Figure 9 is a side elevation of the light shown in Figure 8 with portions broken away.

Referring now to the drawings in which like characters of reference designate similar parts in the various views, 10 designates baggage compartment of a motor vehicle, the same having the usual hinged lid 11. In carrying out the invention a bracket arm 12, having longitudinal reinforcing ribs 13, is provided at the rear end with a hook 14 best shown in Figure 2, adapted to hook over the upper flange 15 of the opening which affords access to the baggage compartment from the rear of the vehicle. At the front end the bracket arm is provided with a bolt 16 having secured thereto a substantially Z-shaped clamp 17 adapted to hook over the front flange 18 of the opening in the baggage compartment which affords access to the compartment from the interior of the vehicle, as best shown in Figure 1.

The combined trouble and trunk light is carried by the bracket arm 12 and comprises substantially oval upper and lower flanges 19 and 20, best show in Figures 3 and 4, between which is secured a relatively smaller over box 21 in which is mounted a lamp bulb 22 which shines through the open bottom of the box. A suitable quantity of lamp cord 23 is wound upon the box between the flanges to permit the lamp to be carried to any part of the car where it may be secured through the medium of a spring clamp 24.

As best shown in Figures 3, 4 and 5 the spring attaching clamp 24 comprises a substantially U-shaped free end 25 which is curved at the sides as shown at 26 to provide a hook for attaching the clamp to a fender or other part of the vehicle. The curved portions 26 merge into parallel legs 27 each of which is provided with a coil spring 28 and beyond the coil spring the legs are directed downwardly and forwardly as shown at 29 in Figure 4 to enter openings 30 in the top of the box 21. The spring clamp 24 may be slipped transversely over the bracket arm 12 to releasably hold the light attached to the bracket arm. The legs 27 of the clamp are provided with upwardly offset portions 31 near the coil spring 28 to permit the legs to lie flat upon the bracket arm between the reinforcing ribs 13.

A conventional socket 32 for the lamp bulb 22 is secured to flanges 33 which are struck up from the material of the box 21. A switch housing 34 is mounted on the bracket arm 12 through the medium of screws 35 or other connectors as best shown in Figures 6 and 7. A pair of contact spring tongues 36 are mounted within the casing and insulated therefrom by a strip 37 of insulating material. Binding posts 38 secure the tongues to the casing and the circuit wires 39 of the lamp cord 23 are connected to the binding posts.

The contact tongues are normally held separated from each other when the lid 11 is closed but are permitted to spring into contact with each other when the lid is opened to close the lamp circuit so that the lamp is automatically energized every time the lid is opened to illuminate the interior of the baggage compartment. For this purpose a lever 40 is pivotally mounted on the bracket arm 12 through the medium of a pivot pin 41 passed through hinge ears 42 which depend from the bottom of the bracket arm. The lever is directed upwardly beyond the pivot pin and is passed through registering openings 43 and 44 formed in the bracket arm and in the bottom of the switch housing respectively. The tip of the lever is provided with an insulating lever 45 which is adapted to project in-between the spring contact 36 and normally hold the same separated in open circuit position. A coil spring 46 is sleeved on the pivot pin and has the ends bearing against the bottom of the bracket arm while a bight 47 in the spring bears against the lever to normally hold the lever raised as shown in full lines in Figure 6 and hold the insulating finger 45 engaged from between the spring contacts 36. When the lid 11 is closed however, it strikes against a knob 48 on the free end of the lever and presses the lever to dotted line position shown in Figure 6 in which position the insulating finger 45 is interposed between the spring contacts and holds the spring contacts in open circuit position.

A modified form of trunk light is shown in Figures 8 and 9. In these figures the reflector 49, corresponding to the box 21 of the preferred form of the invention heretofore described, is pressed from the material of the bracket arm 50 which carries a hook 51 at the rear end and a bolt 52 and substantially Z-shaped clamp 52' at the front end for securing the bracket to the flanges of the baggage compartment. An angular bracket 53 is secured to the underneath face of the bracket arm 50 through the medium of rivets 54 or other connectors and the upstanding leg of the bracket supports the socket 55 and lamp bulb 56.

The switch lever 57 is pivoted as shown at 58 to hinged ears 59 which extend downwardly from the bracket 53 and the free end of the lever is turned upwardly and provided with an insulating finger 60 which is interposed between the spring contacts 61 which are connected in the lamp circuit, heretofore described. The lever is depressed by the lid of the baggage compartment to interpose the finger 60 between the contacts and open the circuit and a spring 62 on the pivot 58 of the lever bears against the lever and moves it upwardly when the lid of the baggage compartment is opened to withdraw the finger 60 from between the contact 61 and permit the contacts to engage each other in circuit closing position as heretofore described.

Since the operation has been described as the description of the parts progressed it is thought that the invention will be fully understood without further explanation.

What is claimed is:

1. A combined trouble and trunk light for automobiles comprising a supporting bracket adapted to be mounted within a vehicle baggage compartment, a lamp housing carried by the bracket, a spring pressed circuit closer carried by the bracket, adjacent the lamp housing and having a portion adapted to be engaged by the lid of the baggage compartment of the vehicle to move the circuit closer to open circuit position when the lid is closed, flanges on the lamp housing, and circuit wires wound upon the lamp housing between the flanges and connected to said circuit closer.

2. A combined trouble and trunk light for automobiles comprising a lamp supporting bracket adapted to be mounted within a vehicle baggage compartment adjacent the top thereof, a lamp housing secured to said bracket, a spring pressed circuit closer adapted to be held in open circuit position by the lid of the baggage compartment, flanges on the lamp housing, lamp cord wound around the housing between the flanges to permit the lamp to be carried to any part of the vehicle, said lamp cord being connected to said circuit closer, and a spring clip on the lamp housing adapted to secure the lamp housing to said bracket or to any portion of the vehicle when the lamp cord is unwound from the lamp housing.

3. A combined trouble and trunk light for automobiles comprising a lamp supporting bracket adapted to be mounted in a vehicle baggage compartment adjacent the top thereof, a lamp housing, a spring clip carried by the lamp housing and removably securing the housing to the bracket, flanges on the lamp housing, lamp cord wound on the housing between the flanges, switch contacts connected to the cord and carried by the bracket, and a trip lever extending into the interior of the compartment lid and having an end interposed between the switch contacts, the lever being actuated to withdraw said end and permit the contacts to engage each other to complete the circuit and light the lamp when the lid is raised.

JOHN KOCH, Jr.